United States Patent
Hofmann et al.

(10) Patent No.: US 9,057,405 B2
(45) Date of Patent: Jun. 16, 2015

(54) METHOD FOR INSTALLING A ROLLING-ELEMENT BEARING

(75) Inventors: Sabine Hofmann, Würzburg (DE); Baozhu Liang, Dittelbrunn-Hambach (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 13/981,099

(22) PCT Filed: Jan. 26, 2012

(86) PCT No.: PCT/EP2012/051208
§ 371 (c)(1),
(2), (4) Date: Nov. 4, 2013

(87) PCT Pub. No.: WO2012/104194
PCT Pub. Date: Aug. 9, 2012

(65) Prior Publication Data
US 2014/0050432 A1    Feb. 20, 2014

(30) Foreign Application Priority Data

Jan. 31, 2011  (DE) .................. 10 2011 003 376

(51) Int. Cl.
*F16C 33/38* (2006.01)
*F16C 33/50* (2006.01)
*F16C 19/06* (2006.01)
*F16C 43/06* (2006.01)

(52) U.S. Cl.
CPC .......... *F16C 33/502* (2013.01); *Y10T 29/49686* (2015.01); *F16C 33/3812* (2013.01); *F16C 33/3875* (2013.01); *F16C 19/06* (2013.01); *F16C 43/065* (2013.01)

(58) Field of Classification Search
CPC .................. F16C 33/3812; F16C 33/3881
USPC .................................................. 384/523, 530
See application file for complete search history.

(56) References Cited

U.S. PATENT DOCUMENTS

| 543,719   | A |   | 7/1895 | Berger |         |
|-----------|---|---|--------|--------|---------|
| 4,844,628 | A | * | 7/1989 | Knappe | 384/510 |

FOREIGN PATENT DOCUMENTS

| DE |    203157 C     | 10/1908 |
|----|-----------------|---------|
| DE |    725180 A     | 9/1942  |
| DE |   1575714 A1    | 2/1970  |
| DE |   8008271 U1    | 6/1980  |
| DE |   8420133 U1    | 6/1980  |
| DE |   3241215 A1    | 5/1984  |
| DE |   3709673 A1    | 10/1988 |
| DE |   4133813 A1    | 4/1993  |
| DE | 102004054128 A1 | 5/2006  |
| DE | 102005047620 B3 | 6/2007  |
| DE | 102009025516 A1 | 12/2010 |
| JP |   2002333036 A  | 11/2002 |
| JP |   2009299820 A  | 12/2009 |
| JP |   2010144794 A  | 7/2010  |
| WO |  20110018489 A1 | 2/2011  |

* cited by examiner

*Primary Examiner* — Phillip A Johnson
(74) *Attorney, Agent, or Firm* — Bryan Peckjian; SKF USA Inc. Patent Dept.

(57) ABSTRACT

A cage segment for a rolling-element bearing has at least one pocket for a rolling element and is formed by a first segment part and a second segment part. The second segment part abuts the first segment part in an axial direction and is connected to the first segment part by an interference-fit or a friction-fit, or in a materially-bonded manner.

19 Claims, 3 Drawing Sheets

METHOD FOR INSTALLING A ROLLING-ELEMENT BEARING

CROSS-REFERENCE

This application is the U.S. National Stage of International Application No. PCT/EP2012/051208 filed on Jan. 26, 2012, which claims priority to German patent application no. 10 2011 003 376.9 filed on Jan. 31, 2011.

TECHNICAL FIELD

The present invention is directed to an easy-to-install cage for rolling-element bearings, and in particular to a cage having cage segments with two or more parts and to a method for their installation.

RELATED ART

In order to prevent rolling elements in a rolling-element bearing from slipping against one another, a cage is often used for separating them from one another. Up to now, among other things, snap cages made of plastic have been used, for example, for ball bearings. In these cages, the cage pockets are laterally open on one side in order to make possible the snapping-in of the ball from the side. Although efficient installation is possible when snap cages are used, if large misalignments of the bearing occur, balls guided by snap cages can jam in the cage pocket or can be ejected therefrom.

To prevent this, a plurality of individual cage segments are often used, wherein the entire circumference of the rolling elements of a rolling-element bearing are enclosed by the cage pocket. Thus it is ensured that the rolling elements are guided securely in the cage, even when the outer ring and inner ring are misaligned. However, in large bearings for example, the one-piece cage segments are difficult to handle during installation and result in a significant installation effort.

For especially large rolling-element bearings, two-part brass cages are also used, which enclose the entire circumference of the rolling element after installation. However, due to the size and the weight of the individual cage halves, the handling is made more difficult with these cages. In addition, a cage made of brass is cost-intensive.

There is therefore the need for an improved cage concept, which ensures that the rolling elements of a rolling-element bearing are reliably guided, while in addition the cage can be efficiently installed.

SUMMARY

Some exemplary embodiments of the present invention make this possible by using a cage segment for a rolling-element bearing, which cage segment on the one hand has at least one pocket for a rolling element and which on the other hand is comprised of a first and a second segment part. The first segment part abuts the second segment part in the axial direction, and is connected therewith in an interference-fit, friction-fit, or materially-bonded manner. This assembly makes it possible to construct and/or use cages, with which a rolling element can be reliably guided. Since the cage segments do not completely extend around the bearing circle and are at least two-part; furthermore, the individual elements are light and can be efficiently installed.

The cage segments are divided in the axial direction, i.e. they are comprised of a first segment part, which is located predominantly on one side of the rolling element, and of a second segment part, which is located on the side of the rolling element that is opposite in the axial direction. The two segment parts are connected to each other and form the cage pocket as a result of corresponding openings. In the usual notation, "axial direction" here means a direction along the axis of rotation of the bearing, while a "radial direction" refers to any direction perpendicular to the axis of rotation. In the following, "tangential directions" are any directions which extend tangentially to a bearing pitch circle, for example to the raceway of the bearing inner ring or of the bearing outer ring.

During installation, the two segment parts are disposed on both sides of a rolling element and are interference-fit, friction-fit, or materially-bonded connected to each other. In some exemplary embodiments, this makes it possible to form a bearing cage using the cage segments, wherein the pocket is fully enclosed by the material of the cage in at least one plane (an axial plane). That is, a rolling element located in the pocket is completely enclosed by the cage and can thereby still be securely guided even with large bearing misalignments. This is made possible without incurring the otherwise usual impairment during installation.

In order to be able to connect the two segment parts to each other, some exemplary embodiments include an attachment device on each of the two sides of a pocket (in the tangential direction, i.e. towards the adjacent pockets); the first segment part can be connected to the second segment part by the attachment device. The attachment device can here for example be a thread, into which a screw for connecting the segment parts can be turned. In other exemplary embodiments, an attachment device can be a simple bore, into which a pin is pressed or adhered, so that the two segment parts are connected to each other via the bore. In other exemplary embodiments, the attachment device can also be a simple opening, in order to accommodate adhesive, which is needed for a materially-bonded connection of the two segment parts. Any measure is thus understood as being an "attachment device" which is suitable to connect the two segment parts to each other.

In further exemplary embodiments of the present invention, the attachment device is further designed such that with it the two segment parts of a cage segment, as well as different cage segments that are adjacent to one another, can be connected to each other. That is, a force-supporting connection with the cage segment adjacent along the cage circumference can also be produced via the attachment device. This improves the stability of the entire cage, so that the quality of the guiding of the rolling elements can be further improved, without additional effort having to be undertaken during the installation of the cage.

Furthermore, in further exemplary embodiments, wherein the adjacent cage segments are connected to one another, the two cage segment parts are disposed offset from one another. That is, the segment parts have not only one common overlap region that forms at least one pocket. The first segment part additionally extends in the tangential direction farther than the second segment part, whereas the second segment part extends in a direction opposite the tangential direction (which direction may sometimes be referred to herein as a direction "against" the tangential direction), farther than the first segment part. When connecting the first and the second segment part, at least one pocket of the cage segment is thus directly formed from the first and the second segment part. The further pockets come into existence when the adjacent cage segments with their respectively protruding segment parts are connected to the protruding first or second segment parts of the first cage segment, so that the pocket is formed by segment parts in this "overlap region", which segment parts respectively belong to other cage segments. This additionally increases the stability of the entire cage due to the more resilient connection.

In some exemplary embodiments, the cage segment is manufactured from plastic, which can substantially reduce the production costs and increases the variety of shapes of the possible cages.

Rolling-element bearings, which use exemplary embodiments of inventive cage segments, thus enable a secure guidance of the rolling elements, wherein the installation costs can be reduced at the same time without impairing the stability and the performance of the overall system.

Here and in the following, "cage segment" shall be understood to mean a part of a cage which does not extend entirely around the bearing pitch circle. Thus cage segments can cover any angle, for example 30°, 60° or 90° of the entire bearing circumference. In other words, a cage segment contains at least one pocket for a rolling element, but can also have 2, 3, or any number of pockets, depending on the design requirements.

BRIEF DESCRIPTION OF THE DRAWINGS

Although the individual exemplary embodiments of the present invention, now discussed with the assistance of the accompanying Figures, each show one cage for a ball bearing, it is self-evident that alternative cage segments can also be designed and used for any other rolling-element shape. For example tapered roller bearings, cylindrical roller bearings, barrel roller bearings or the like may be considered as such alternatives. The Figures show in detail.

DETAILED DESCRIPTION

Figure 1:
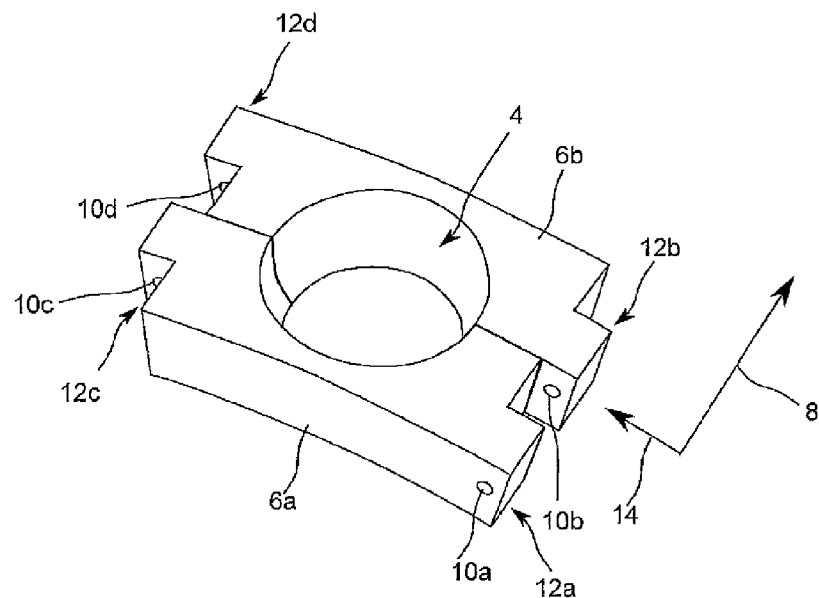
FIG. 1—an exemplary embodiment of a cage segment.

FIG. 1 shows an exemplary embodiment of a cage segment 2, which has a pocket 4 for a rolling element and is formed from a first segment part 6a and a second segment part 6b, where the second segment part 6b abuts the first segment part 6a in an axial direction 8 and can be connected or is connected to it in an interference-fit, friction-fit, or materially-bonded manner.

As usual, the plastic cage or the cage segment illustrated in FIG. 1 serves to prevent a touching of the rolling elements in a rolling-element bearing by separating the rolling elements.

In the exemplary embodiment shown in FIG. 1, the contour of the pocket 4 is matched to the shape of a ball; it is thus a segment of a cage for a ball bearing. It is self-evident that in alternative exemplary embodiments, cage segments can also be used for other rolling-element bearing types. For a cylindrical roller bearing, the shape of the pocket would accordingly be cylindrical or cuboidal and/or the cross-section would be square or rectangular.

Although the exemplary embodiments discussed in the following show shoulder-guided cage variants or cage segments, as is more clearly visible in FIG. 3, it is self-evident that in alternative embodiments rolling-element-guided cage segments can also be used.

Due to the separation of the cage segments 6a and 6b in the axial direction 8, as is illustrated in FIG. 1, the cage can be installed for example in a bearing already completely filled with rolling elements, by first abutting the cage segments of both sides of the bearing, whereupon the cage segment segments are then connected to each other. In order to make possible a connection of the first segment part 6a to the second segment part 6b, both segment parts each respectively have, as attachment devices, bores 10a to 10b on both sides of the cage pocket 4. Using these bores, the segment parts 6a and 6b can be connected to each other, for example by pressing, screwing, or adhering a pin into the bores. In the exemplary embodiment illustrated in FIG. 1, the attachment devices are in addition designed such that adjacent cage segments can also be connected to one another by using the same attachment devices (via the bores 10a to 10d).

In the exemplary embodiment shown, this is achieved in that the cage segments 6a and 6b respectively have projections 12a and 12b, whose geometric form is chosen such that they each overlap with the corresponding projections of an adjacent cage segment, so that by using a single pin or a single screw, the segment parts 6a and 6b can be connected to each other, and the cage segment 2 can be connected to the adjacent cage segment. Thus a cage results, which is composed of individual segments, which are however each connected to the adjacent segments and thus to form a completely encircling cage.

To accomplish this, the projections to 12d with the axially extending bores 10a to 10d therefore extend in and/or against the tangential direction 14, in order to achieve an overlap with the cage segments, which are adjacent in the tangential direction 14; the overlap can be used for connecting to the adjacent cage segments.

Figure 2:
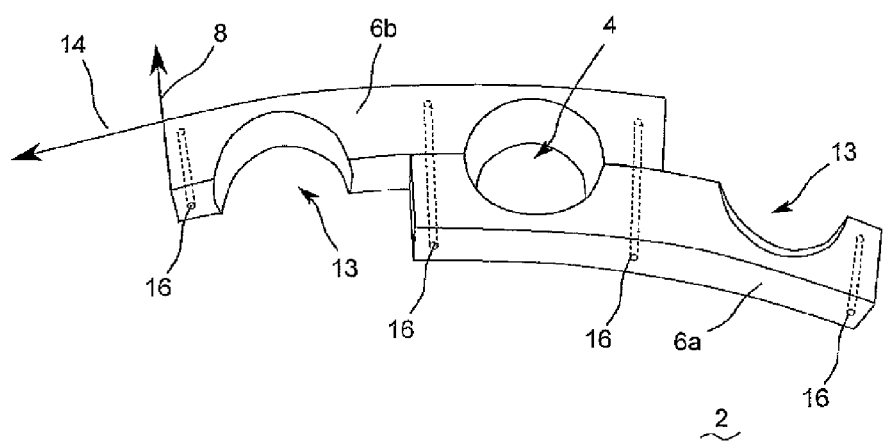
FIG. 2—a further exemplary embodiment of a cage segment.

FIG. 2 shows an alternative exemplary embodiment of a cage segment 2, which also is comprised of a first segment part 6a and a second segment part 6b. In the exemplary embodiment illustrated in FIG. 2, the cage pocket 4 is also formed by the two mutually connected segment parts 6a and 6b, which each have an opening 13 corresponding to the shape of the pocket for this purpose; the opening 13 is matched to the contour of the rolling element. Unlike the case shown in FIG. 1, the overlap, which is used for connecting the cage segments to adjacent cage segments, is achieved such that the two segment parts 6a and 6b only mutually overlap in an overlap region along their tangential extension or directly abut one another. In addition, the first and the second segment part 6a and 6b extend in and/or against the tangential direction 14 beyond the overlap region. Due to this arrangement, the segment parts 6a and 6b of an individual cage segment 2 can be connected to each other, and the adjacent cage segments can also be connected to one another. In this case this can occur via the bores 16, which can accommodate pins or screws or the like. Alternatively, the segments or the segment parts can also be bonded to each other or can be connected to each other in another type of interference-fit, friction-fit, or materially-bonded manner Although in the previous exemplary embodiments the pockets 4 of the cage segments 2 are formed from two symmetrical openings 13 in the different segment parts 6a and 6b, in alternative exemplary embodiments the corresponding openings can also be asymmetrical, i.e. have a different shape for the two different segment parts. For tapered roller bearings or cylindrical roller bearings, the opening can even be formed only on one of the segment parts 6a or 6b.

Figure 3:
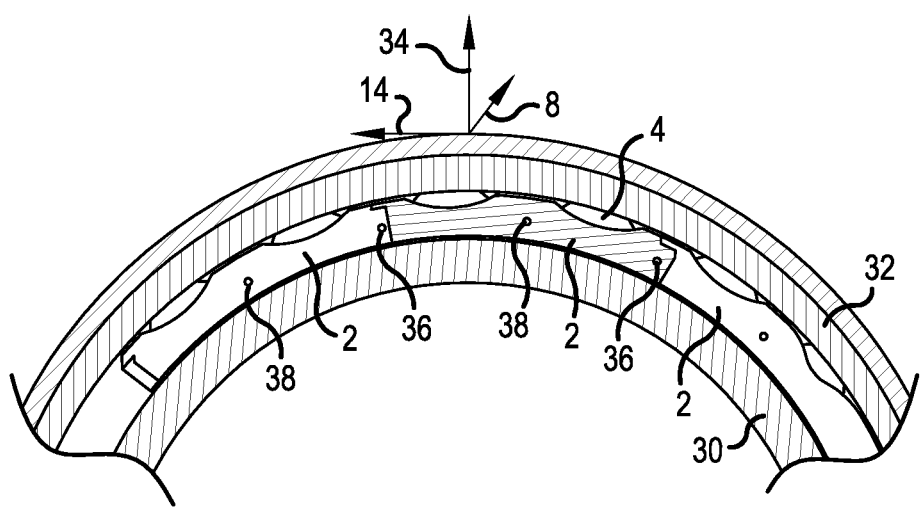
FIG. 3—the exemplary embodiment of the cage segment of FIG. 2 in the installed state.

As illustrated in an exemplarily manner with the assistance of the view of a ball bearing in FIG. 3, in further exemplary embodiments of cage segments, based for example on the example from FIG. 1, a cage segment can also be modified such that it comprises two pockets per segment. Compared to the example in FIG. 2, one bore, which is required for connecting the cage segments or the segment parts to each other, can thereby be omitted.

FIG. 3 shows here exemplary embodiments of inventive cage segments in the installed state in a radial bearing and/or in a ball bearing. The radial bearing includes an inner ring 30 and an outer ring 32, which is spaced from the inner ring 30 in the radial direction 34 and is disposed concentric to it. The rolling elements, in this case balls, circulate between the inner ring 30 and the outer ring 32, which rolling elements are guided by exemplary embodiments of inventive cage segments 2. The cage segments 2 each have two cage pockets 4 and are connected to the respective adjacent cage segments via a connecting bore 36, which extends axially through projections of the cage segments 2, as was already explained with the assistance of FIG. 1.

Additional bores 38 are each located approximately in the center of the individual segments 2 and serve to strengthen the connection of the segment parts 6a and 6b of the individual cage segments to each other.

In summary, exemplary embodiments of the invention can be used as shoulder-guided as well as rolling-element-guided variants. In order to make possible a simpler handling of the cage as well as the secure guiding of the rolling elements in the cage pockets, the plastic cage for rolling-element bearings is comprised of individual cage segments, which are assembled into a cage. A cage segment can be designed with a different number of cage pockets. It can be one or a plurality of cage pockets. A cage can be comprised of two or more assembled segments, wherein one or a plurality of cage pockets are located in each segment. Projections having an axial bore can be disposed at both ends of a cage segment; the further segments for completion of a cage or a cage half can be aligned and attached by using the projections/bores. Viewed in the circumferential direction, a transverse bore for connecting the cage segments as well as the cage halves follows each cage pocket. When installed, the individual cage segments in the bearing are assembled into a cage. For example, as compared to the plastic snap cages for ball bearings, the cage variant comprised of individual segments has the advantage that the performance of the bearing is ensured even with large misalignments.

Figure 4:
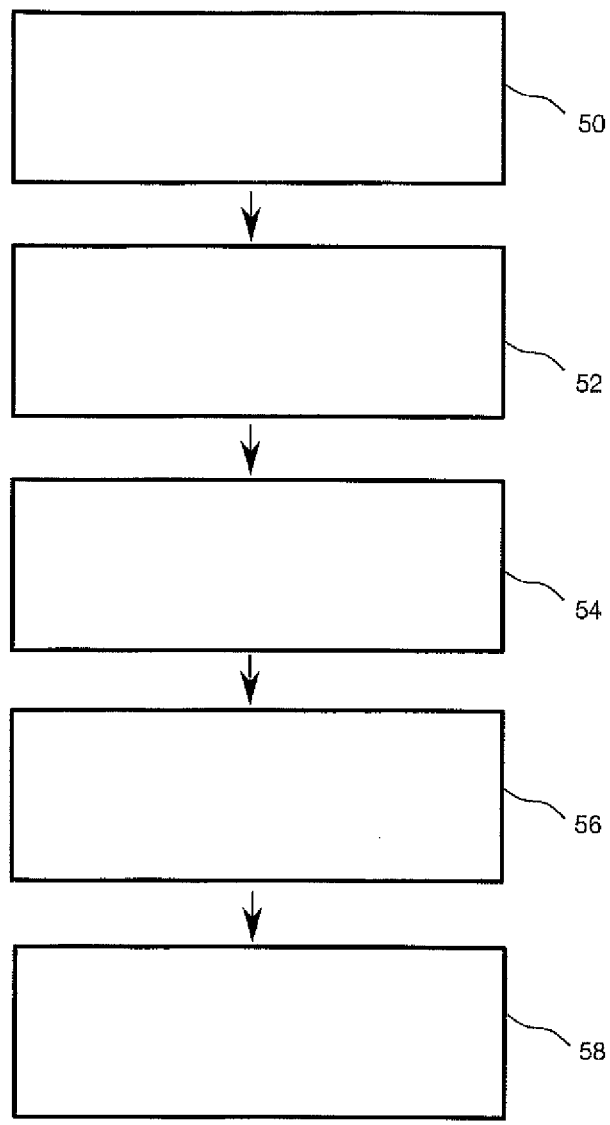
FIG. 4—an example of a method for installing a bearing.

FIG. 4 schematically shows an exemplary embodiment of a method for installing a rolling-element bearing, comprising:

In a provision step 50, providing a first segment part and a second segment part of a cage segment, which has at least one pocket for a rolling element and is comprised of a first segment part and of a second segment part, wherein the second segment part abuts the first segment part in an axial direction and is connectable to it in an interference-fit, friction-fit, or materially-bonded manner.

In a fill step 52, disposing a rolling element between a bearing outer ring and a bearing inner ring of the rolling-element bearing;

In a first alignment step 54, disposing the first segment part between the bearing outer ring and the bearing inner ring of the rolling-element bearing, so that the rolling element is located in an opening for the pocket in the first segment part.

In a second alignment step 56, disposing the second segment part on the side of the rolling-element bearing opposite the first segment part in the axial direction.

In a connection step 58, interference-fit, friction-fit, or materially-bonded connecting the first and the second segment parts.

REFERENCE NUMBER LIST

2 Cage segment
4 Pocket
6a First segment part
6b Second segment part
8 Axial direction
10a-10d Bore
12a-12d Projection
14 Tangential direction
13 Opening
16 Bore
30 Inner ring
32 Outer ring
34 Radial direction
36 Connecting bore
38 Further bore
50 Provision step
52 Fill step
54 First alignment step
56 Second alignment step
58 Connection step

The invention claimed is:

1. A cage segment for a rolling-element bearing, wherein the cage segment has at least one pocket for a rolling element and comprises a first segment part and a second segment part, wherein the second segment part abuts the first segment part in an axial direction and is connected to the first segment part in an interference-fit, friction-fit, or materially-bonded manner, the cage segment including an attachment device on both sides of the at least one pocket along a tangential direction perpendicular to the axial direction, the attachment device being formed such that the first segment part is connectable with the second segment part by using the attachment device,
 wherein the attachment device comprises a bore, which extends in the axial direction through the cage segment.

2. The cage segment according to claim 1, wherein the at least one pocket is fully enclosed in an axial plane by a material of the cage segment.

3. The cage segment according to claim 1, wherein the cage segment is comprised of a plastic.

4. The cage segment according to claim 1, wherein the first segment part additionally has an opening for a second pocket, the opening for a second pocket being spaced in the tangential direction from the pocket, and wherein the second segment part additionally has an opening for a third pocket, the opening for the third pocket being spaced in an opposite tangential direction from the pocket.

5. A rolling-element bearing including at least one rolling element and at least one cage segment according to claim 1, wherein the rolling element is disposed in the pocket of the cage segment.

6. The rolling-element bearing according to claim 5, wherein the rolling element is a ball.

7. The cage segment according to claim 1, further including an attachment device on both sides of the pocket along a tangential direction perpendicular to the axial direction the attachment device being formed such that the first segment part is connectable with the second segment part by using the attachment device, wherein the attachment device comprises a bore which extends in the axial direction through the cage segment and wherein the pocket is fully enclosed in an axial plane by a material of the cage segment.

8. The cage segment according to claim 7, wherein the first segment part additionally has a second opening for a second pocket, the second opening being spaced in the tangential direction from the pocket, and wherein the second segment part additionally has a third opening for a third pocket, the third opening being spaced in an opposite tangential direction from the pocket.

9. The cage segment according to claim 8 including a rolling element in the at least one pocket.

10. The cage segment according to claim 1, wherein the at least one pocket comprises first and second tangentially spaced pockets.

11. The cage segment according to claim 1, wherein the attachment device is further formed to connect the cage segment to a further cage segment that abuts in the tangential-direction.

12. A cage segment for a rolling-element bearing, wherein the cage segment has at least one pocket for a rolling element and comprises a first segment part and a second segment part, wherein the second segment part abuts the first segment part in an axial direction and is connected to the first segment part in an interference-fit, friction-fit, or materially-bonded manner and including an attachment device on both sides of the at least one pocket along a tangential direction perpendicular to the axial direction, the attachment device being formed such that the first segment part is connectable with the second segment part by using the attachment device,
    wherein the attachment device is further formed to connect the cage segment to a further cage segment that abuts in the tangential-direction.

13. The cage segment according to claim 12, wherein the attachment device comprises a bore, which extends in the axial direction through the cage segment.

14. A method for installing a rolling-element bearing, comprising:
    providing a cage segment, which has at least one pocket for a rolling element and comprises a first segment part having a pocket half and an axial bore spaced from the first segment part pocket half and a second segment part having a pocket half and an axial bore spaced from the second segment part pocket half, wherein the second segment part abuts the first segment part in an axial direction and is connectable to the first segment part by an interference-fit, or a friction-fit, or in a materially-bonded manner;
    disposing a rolling element between a bearing outer ring and a bearing inner ring of the rolling-element bearing;
    disposing the first segment part between the bearing outer ring and the bearing inner ring of the rolling-element bearing, so that the rolling element is located in the pocket half in the first segment part;
    disposing the second segment part on the side of the rolling-element bearing opposite the first segment part in the axial direction so that the rolling element is located in the pocket half in the second segment part; and
    connecting the first segment part and the second segment part by an interference fit, a friction fit or in a materially bonded manner by inserting a pin through the axial bore in the first segment part and into the axial bore in the second segment part.

15. A cage segment for a rolling-element bearing comprising:
    a first segment part having a first pocket half facing in a first axial direction;
    a second segment part having a second pocket half facing in a second axial direction opposite the first axial direction and aligned with the pocket half to form a pocket,
    wherein the first segment part abuts the second segment part in the first axial direction, and
    wherein the first segment part is connected to the second segment part by an interference fit or by a friction fit or in a materially bonded manner, and
    wherein a first end of the first segment part includes a projection having a first axial bore and a first end of the second segment part includes a projection having a second axial bore aligned with the first axial bore.

16. The cage segment according to claim 15, wherein the first segment part and the second segment part have first and second parallel axial side surfaces and arcuate top and bottom surfaces between the first and second side surfaces and wherein the first pocket half is located in the first side surface of the first segment part and the second pocket half is located in the second side surface of the second segment part.

17. The cage segment according to claim 16 including a rolling element in the pocket.

18. The cage segment according to claim 15 wherein the first segment part includes a third pocket half facing in the first axial direction and the second segment part includes a fourth pocket half facing in the second axial direction and wherein the third pocket half and the fourth pocket half are located on tangentially opposite sides of the pocket.

19. The cage segment according to claim 15, wherein the projection and first axial bore of the first segment part and the projection and second axial bore of the second segment part are configured to connect the cage segment to a further cage segment that abuts in the tangential-direction.

* * * * *